US009560032B2

(12) United States Patent
Kim et al.

(10) Patent No.: US 9,560,032 B2
(45) Date of Patent: Jan. 31, 2017

(54) METHOD AND APPARATUS FOR PREVENTING ILLEGITIMATE OUTFLOW OF ELECTRONIC DOCUMENT (71) Applicant: ELECTRONICS AND TELECOMMUNICATIONS RESEARCH INSTITUTE, Daejeon (KR)

(72) Inventors: Min Sik Kim, Daejeon (KR); Seung Jin Ryu, Daejeon (KR); Ki Heon Kim, Daejeon (KR); Han Jun Yoon, Daejeon (KR); Do Hoon Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/736,144

(22) Filed: Jun. 10, 2015

(65) Prior Publication Data
US 2016/0021082 A1 Jan. 21, 2016

(30) Foreign Application Priority Data
Jul. 17, 2014 (KR) .................. 10-2014-0090128

(51) Int. Cl.
G06F 12/16 (2006.01)
H04L 29/06 (2006.01)
(Continued)

(52) U.S. Cl.
CPC ......... *H04L 63/08* (2013.01); *G06F 17/30011* (2013.01); *G06F 21/53* (2013.01);
(Continued)

(58) Field of Classification Search
CPC ................................................... G06F 21/556
See application file for complete search history.

(56) References Cited

U.S. PATENT DOCUMENTS

2006/0290981 A1* 12/2006 Oh ..................... G06F 21/608
358/1.15
2008/0229041 A1 9/2008 Baek et al.
(Continued)

FOREIGN PATENT DOCUMENTS

KR 10-2006-0058427 A 5/2006
KR 10-2008-0029602 A 4/2008
(Continued)

OTHER PUBLICATIONS

Seo Dae Hee et al., "Secure Knowledge Management for Prevent illegal data leakage by Internal users," Korean Society for Internet Information, Apr. 2010, vol. 11, No. 2, pp. 73-84.
(Continued)

*Primary Examiner* — Josnel Jeudy
(74) *Attorney, Agent, or Firm* — LRK Patent Law Firm (57) ABSTRACT An apparatus and method for preventing illegitimate outflow of an electronic document. The apparatus includes a taking-out control unit, a taking-out management server unit, and a self-response agent unit. The taking-out control unit generates a virtual disk for storing an electronic document to be controlled, and controls the taking-out of the electronic document. The taking-out management server unit authenticates whether the taking-out of the electronic document is legitimate taking-out. The self-response agent unit performs self-extinction when a result indicating illegitimate outflow is received from the taking-out management server unit.

12 Claims, 4 Drawing Sheets (51) Int. Cl.
  *G06F 21/53*      (2013.01)
  *G06F 21/55*      (2013.01)
  *G06F 17/30*      (2006.01)

(52) U.S. Cl.
  CPC .......... *G06F 21/554* (2013.01); *G06F 21/556* (2013.01); *H04L 63/105* (2013.01); *G06F 2221/2129* (2013.01); *G06F 2221/2137* (2013.01); *G06F 2221/2147* (2013.01)

(56) References Cited

U.S. PATENT DOCUMENTS

| | | |
|---|---|---|
| 2011/0321040 A1 | 12/2011 | Sobel et al. |
| 2012/0144500 A1 | 6/2012 | Kang et al. |
| 2014/0026181 A1 | 1/2014 | Kiang et al. |
| 2014/0032759 A1* | 1/2014 | Barton .................... H04L 67/10 709/225 |
| 2014/0165137 A1 | 6/2014 | Balinsky et al. |

FOREIGN PATENT DOCUMENTS

| | | |
|---|---|---|
| KR | 10-2009-0024336 A | 3/2009 |
| KR | 10-2011-0054778 A | 5/2011 |
| KR | 10-2012-0101236 A | 9/2012 |
| KR | 10-2012-0139271 A | 12/2012 |
| KR | 10-1315482 B1 | 11/2013 |

OTHER PUBLICATIONS

Jae-Ho Jung, "Zirangyo Soft Provides System for Secured File Transferring/Approval for Financial and Big Company," Edaily eNews, Jun. 14, 2013.

\* cited by examiner

METHOD AND APPARATUS FOR PREVENTING ILLEGITIMATE OUTFLOW OF ELECTRONIC DOCUMENT

CROSS-REFERENCE TO RELATED APPLICATION

This application claims the benefit of Korean Patent Application No. 10-2014-0090128, filed Jul. 17, 2014, which is hereby incorporated by reference herein in its entirety.

BACKGROUND

1. Technical Field

Embodiments of the present invention relate generally to a method and apparatus for preventing the illegitimate outflow of an electronic document and, more particularly, to a method and apparatus that are capable of, when the illegitimate outflow of an electronic document is attempted, determining whether the electronic document is illegitimately leaked using an authentication process and then preventing the illegitimate outflow of the electronic document via electronic document self-response (or self-extinction) and illegitimate outflow source tracking.

2. Description of the Related Art

With the development of technologies by companies, the illegitimate outflow of advanced industrial technologies continues to increase.

The illegitimate outflow of technology is chiefly performed by an intelligent hacking scheme or an insider who cleverly makes use of the drawbacks of an existing security system. Accordingly, there is a need for technology for preventing the illegitimate outflow of electronic documents.

Information protection technologies, such as digital rights management (DRM) and data loss prevention (DLP), have been proposed and developed as technologies for preventing the illegitimate outflow of electronic documents.

It is however not easy to completely take measures against the illegitimate outflow of an electronic document because a hacking scheme continues to become increasingly intelligent and an insider cleverly performs the illegitimate outflow of an electronic document.

In particular, existing methods are chiefly intended to protect a system in which information is stored from a threat or to simply encrypt, store, and manage data to be protected, and thus have a limitation in terms of a perfect response when the illegitimate outflow of an electronic document to be protected is attempted.

A related art is disclosed in a paper entitled "Secure Knowledge Management for Prevent illegal data leakage by Internal users" published in No. 2 of Vol. 11 of Korean Society For Internet Information in April of 2010. In this paper, explicit authentication is performed on an internal user, data is provided based on the explicit authentication, and the illegitimate outflow of data by an internal user is prevented using 2MAC.

As another related art, Korean Patent Application Publication No. 2008-0029602 entitled "Method and Apparatus for Preventing Illegitimate outflow of Confidential Information" discloses a technology in which the illegitimate outflow of a confidential document is prevented using machine learning (based on a language) and finger printing (not based on a language) in a system for preventing the illegitimate outflow of confidential document.

SUMMARY

At least some embodiments of the present invention are directed to the provision of a method and apparatus for preventing the illegitimate outflow of an electronic document, which is capable of, when an illegitimate outflow is attempted, making a self-response and tracking an illegitimate outflow source, thereby fundamentally blocking the illegitimate outflow of an electronic document.

In accordance with an aspect of the present invention, there is provided an apparatus for preventing illegitimate outflow of an electronic document, the apparatus including: a taking-out control unit configured to generate a virtual disk for storing an electronic document to be controlled and control the outflow of the electronic document; a taking-out management server unit configured to authenticate whether the taking-out of the electronic document is legitimate taking-out; and a self-response agent unit configured to perform self-extinction when a result indicating illegitimate outflow is received from the taking-out management server unit.

The self-response agent unit may provide the taking-out management server unit with information about a target to which the electronic document is to be transferred in order to request authentication from the taking-out management server unit.

The information about the target may include one or more of pieces of information about the host name, Media Access Control (MAC) address, Internet Protocol (IP) address, and network of a terminal.

The taking-out control unit may be included in each of the personal computer (PC) unit of a taking-out approval requester and the PC unit of a taking-out approval granter; and, when the taking-out control unit of the PC unit of the taking-out approval requester generates a taking-out request draft of the electronic document and sends the taking-out request draft to the PC unit of the taking-out approval granter via the taking-out management server unit, the taking-out control unit of the PC unit of the taking-out approval granter approves the taking-out of the electronic document and sends the result of the approval to the taking-out control unit of the PC unit of the taking-out approval requester via the taking-out management server unit.

The taking-out control unit of the PC unit of the taking-out approval requester may include: a virtual disk generation and management unit configured to generate and manage the virtual disk; and a taking-out request agent unit configured to request the taking-out of the electronic document.

The taking-out control unit of the PC unit of the taking-out approval granter may include: a virtual disk generation and management unit configured to generate and manage the virtual disk; and a taking-out approval agent unit configured to approve the taking-out of the electronic document.

The taking-out control unit may control the taking-out of the electronic document using the hash value of the electronic document, the title of the electronic document, information about the MAC address, IP address, and host name of a receiver terminal of the electronic document, and information about a drafter or granter.

The taking-out control unit may limit an application that can access an area of the generated virtual disk, may control the execution of the electronic document so that the electronic document can be executed on the virtual disk, and may encrypt the area of the virtual disk.

The taking-out management server unit may authenticate whether the taking-out of the electronic document is legitimate taking-out within a preset legitimate taking-out authentication request period.

In accordance with another aspect of the present invention, there is provided a method for preventing illegitimate outflow of an electronic document, the method including:

generating and managing, by the taking-out control units of the PC unit of a taking-out approval requester and the PC unit of a taking-out approval granter, respective virtual disks for storing an electronic document to be controlled; controlling, by the taking-out control units of the PC unit of the taking-out approval requester and the PC unit, of the taking-out approval granter, the taking-out of the electronic document via a taking-out management server unit; authenticating, by the taking-out management server unit, whether the taking-out of the electronic document is legitimate taking-out; and performing, by a self-response agent unit, self-extinction when a result indicating illegitimate outflow is received as a result of authenticating whether the taking-out of the electronic document is legitimate taking-out.

Authenticating whether the taking-out of the electronic document is legitimate taking-out may include authenticating whether the taking-out of the electronic document is legitimate taking-out based on information about a target to which the electronic document is to be transferred.

The information about the target may include one or more of pieces of information about the host name, MAC address, IP address, and network of a terminal.

Controlling the taking-out of the electronic document may include: generating, by the taking-out control unit of the PC unit of the taking-out approval requester, a taking-out request draft of the electronic document and, by the taking-out control unit of the PC unit of the taking-out approval requester, sending the taking-out request draft to the PC unit of the taking-out approval granter via the taking-out management server unit; and approving, by the taking-out control unit of the PC unit of the taking-out approval granter, the taking-out of the electronic document and sending, by the taking-out control unit of the PC unit of the taking-out approval granter, a result of the approval to the taking-out control unit of the PC unit of the taking-out approval requester via the taking-out management server unit.

Controlling the taking-out of the electronic document may include controlling the taking-out of the electronic document using the hash value of the electronic document, the title of the electronic document, information about the MAC address, IP address, and host name of a receiver terminal of the electronic document, and information about a drafter or granter.

Generating and managing the respective virtual disks may include limiting an application that can access an area of the generated virtual disk, controlling the execution of the electronic document so that the electronic document can be executed on the virtual disk, and encrypting the area of the virtual disk.

Authenticating whether the taking-out of the electronic document is legitimate taking-out may include authenticating whether the taking-out of the electronic document is legitimate taking-out within a preset legitimate taking-out authentication request period.

BRIEF DESCRIPTION OF THE DRAWINGS

The above and other objects, features and advantages of an embodiment of the present invention will be more clearly understood from the following detailed description taken in conjunction with the accompanying, drawings, in which.

DETAILED DESCRIPTION

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference symbols are assigned to like components throughout the drawings and redundant descriptions of the like components are omitted.

Figure 1:
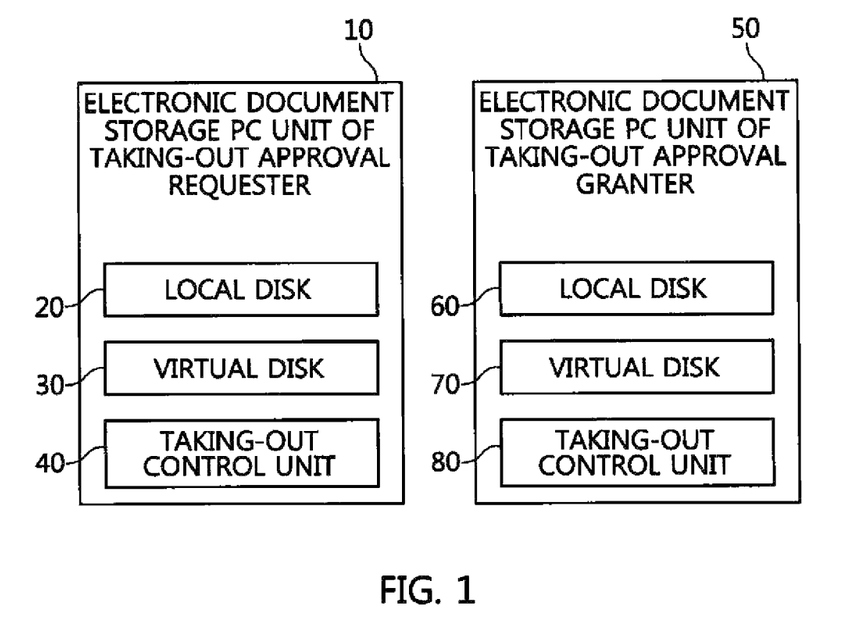
FIG. 1 is a configuration diagram of an electronic document storage PC unit adopted in an embodiment of the present invention.
Figure 2:
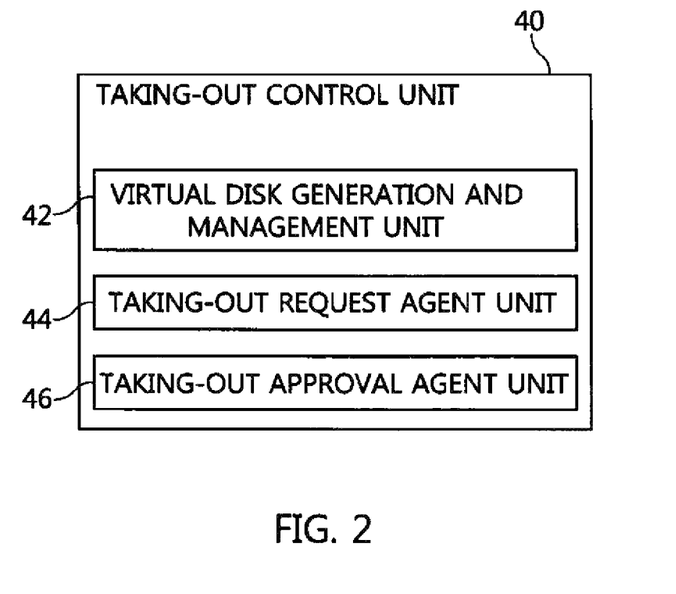
FIG. 2 is an internal configuration diagram of the taking-out control unit of FIG. 1.
Figure 3:
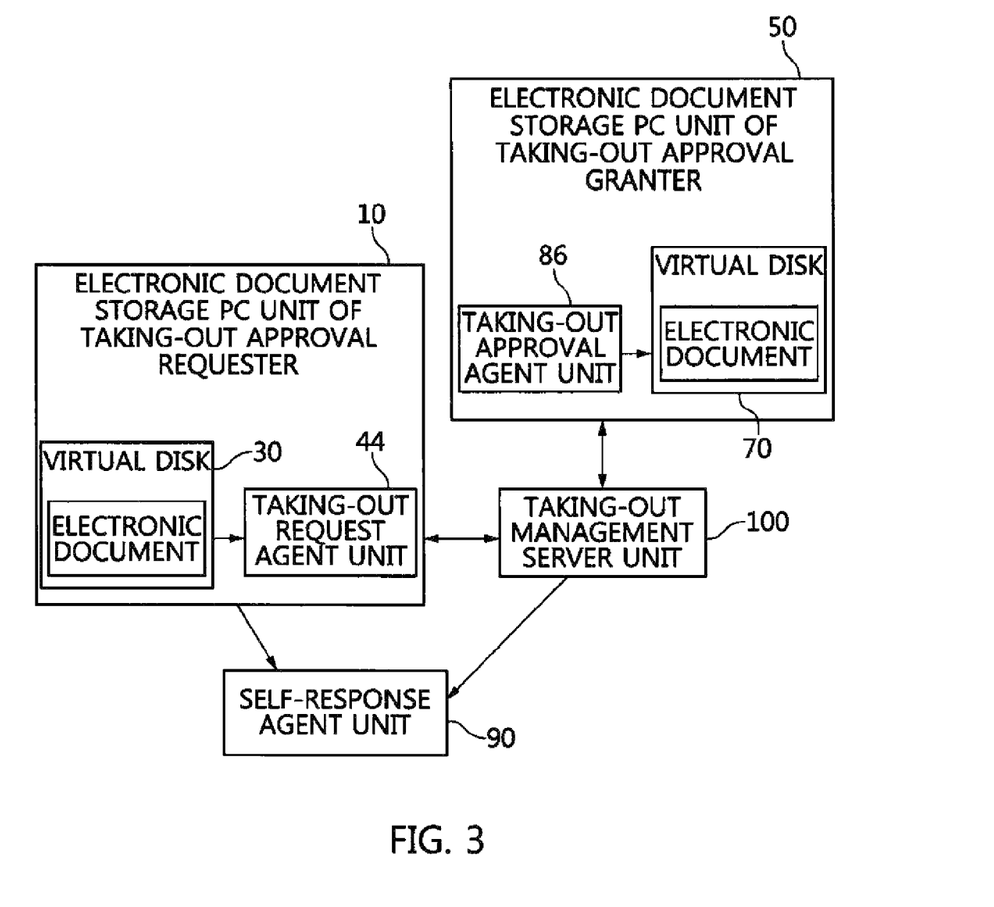
FIG. 3 is a configuration diagram of a system for preventing the illegitimate outflow of an electronic document according to an embodiment of the present invention.

FIG. 1 is a configuration diagram of an electronic document storage PC unit adopted in an embodiment of the present invention, FIG. 2 is an internal configuration diagram of the taking-out control unit of FIG. 1, and FIG. 3 is a configuration diagram of a system for preventing the illegitimate outflow of an electronic document according to an embodiment of the present invention.

Electronic document storage PC units 10 and 50 are divided into the electronic document storage PC unit 10 of a taking-out approval requester and the electronic document storage PC unit 50 of a taking-out approval granter.

That is, the electronic document storage PC unit 10 of the taking-out approval requester and the electronic document storage PC unit 50 of the taking-out approval granter include respective local disks 20 and 60, respective virtual disks 30 and 70, and respective taking-out control units 40 and 80. In other words, the electronic document storage PC unit 10 of the taking-out approval requester and the electronic document storage PC unit 50 of the taking-out approval granter may be viewed as having the same internal components. In this case, the electronic document storage PC unit 10 of the taking-out approval requester may be the PC unit of a taking-out approval requester described in the claims, and the electronic document storage PC unit 50 of the taking-out approval granter may be the PC unit of a taking-out approval granter described in the claims.

Furthermore, the electronic document storage PC units 10 and 50 may be viewed as electronic document storage server units.

The local disks 20 and 60 are data storage spaces provided by the hard disk drives (HDDs)/solid state drives (SSDs) of the respective electronic document storage PC units 10 and 50. The local disks 20 and 60 may be viewed as spaces in which files not to be controlled are stored.

The virtual disks 30 and 70 are spaces in which electronic documents to be controlled are stored. The areas of the virtual disks 30 and 70 may be encrypted on a per-block basis. A self-response agent unit 90 is generated in an electronic document taking-out request process step. The electronic document storage PC unit 10 of the taking-out approval requester may download the self-response agent unit 90 from a taking-out management server unit 100 after obtaining taking-out approval.

The taking-out control units 40 and 80 control the taking-out of an electronic document. The taking-out control units 40 and 80 may be may be viewed as agent programs based on device drivers. When being installed on the electronic document storage PC units 10 and 50, the taking-out control units 40 and 80 generate the areas of the virtual disks 30 and 70, forcibly stores an electronic document to be controlled in the areas of the virtual disks 30 and 70, and then controls the taking-out of the electronic document. In this case, an agent may be may be viewed as an autonomous process that performs a task for a specific purpose (e.g., the control of the taking-out of the electronic document in the present embodiment) on behalf of a user.

For example, when a control electronic document (i.e., an electronic document to be controlled) stored on the virtual disk 30 is to be transferred, the taking-out control unit 40 supports the electronic document storage PC unit 10 of the taking-out approval requester (i.e., a drafter PC) so that it can generate a taking-out approval request (including information about an taking-out target PC (e.g., information about the MAC address, IP address, and host name of the PC)) to the electronic document storage PC unit 50 of the taking-out approval granter (i.e., a granter PC). In this case, the taking-out control unit 80 of the electronic document storage PC unit 50 of the taking-out approval granter functions to permit the taking-out of the electronic document by examining and approving an electronic document taking-out approval request draft of the drafter.

While the taking-out approval request for the electronic document is being made, the electronic document to be transferred is sent and received in the form of the self-response agent unit 90 including the electronic document. When the taking-out is approved, the drafter downloads the electronic document to be transferred from the taking-out management server unit 100 in the form of the self-response agent unit, and transfers the downloaded electronic document to the outside (including an intranet, and all PCs other than the drafter PC).

The internal configuration of the taking-out control unit 40 is described below. As illustrated in FIG. 2, the taking-out control unit 40 may include a virtual disk generation and management unit 42, a taking-out request agent unit 44, and a taking-out approval agent unit 46.

The virtual disk generation and management unit 42 is responsible for the generation, access control and execution control of the virtual disk 30.

The taking-out request agent unit 44 is responsible for the combination of an electronic document to be transferred and a self-response agent, and is also response for a taking-out approval request.

The taking-out approval agent unit 46 is responsible for the handling of a taking-out approval.

The internal configuration of the taking-out control unit 40 of FIG. 2 may be viewed as collectively representing the internal configurations of the taking-out control units included in the electronic document storage PC unit 10 of the taking-out approval requester and the electronic document storage PC unit 50 of the taking-out approval granter. Actually, the taking-out control unit 40 of the electronic document storage PC unit 10 of the taking-out approval requester includes the virtual disk generation management unit 42 and the taking-out request agent unit 44. The taking-out control unit 80 of the electronic document storage PC unit 50 of the taking-out approval granter includes the virtual disk generation and management unit 42 and the taking-out approval agent unit 46 (denoted as a taking-out approval agent unit 86 in FIG. 3).

As described above, the taking-out control unit 40 may restrict an application that can access the area of the generated virtual disk 30, may control the execution of an electronic document so that the electronic document can be executed only on the virtual disk 30, and may encrypt the area of the virtual disk 30. Furthermore, in order to control the taking-out of the electronic document, the taking-out control unit 40 may use the hash value of the electronic document, the title of the electronic document, information about the MAC address, IP address, and host name of the receiver terminal of the electronic document, and information about a drafter/granter (e.g., information about a facial image, an iris, or a fingerprint).

Although reference symbol 10 has been illustrated as designating the electronic document storage PC unit of the taking-out approval requester and reference symbol 50 has been illustrated as designating the electronic document storage PC unit of the taking-out approval granter in FIG. 1 for convenience of description, they are interchangeable according to the circumstance.

The self-response agent unit 90 of FIG. 3 is an agent in an execution file (EXE) form, and includes an electronic document to be transferred. The self-response agent unit 90 includes the hash value of an electronic document to be transferred and the file name of the electronic document in the form of meta-information.

When the self-response agent unit 90 including an electronic document as described above is to be executed, the self-response agent unit 90 sends information about a PC on which the electronic document will be executed to the taking-out management server unit 100. The reason for this is to authenticate whether the execution PC is a legitimate target. The self-response agent unit 90 sends information about a corresponding execution PC to the taking-out management server unit 100 when an authentication request is made.

Furthermore, when a result indicating illegitimate outflow is received from the taking-out management server unit 100, the self-response agent unit 90 may perform self-extinction without generating an electronic document. When a result indicating legitimate taking-out is received from the taking-out management server unit 100, the self-response agent unit 90 may generate an electronic document and then perform self-extinction.

Accordingly, the self-response agent unit 90 may be viewed as an autonomous process that actively performs a self-extinction task without generating an electronic document on behalf of a user when the electronic document is illegitimately transferred to the outside.

The taking-out management server unit 100 stores and manages all the histories of the taking-out request agent unit 44 and the taking-out approval agent unit 86. That is, the taking-out management server unit 100 stores and manages information about an electronic document whose taking-out has been permitted and information about an external receiver.

Furthermore, the taking-out management server unit 100 stores and manages the self-response agent unit 90.

Furthermore, when the self-response agent unit 90 is externally executed, the taking-out management server unit 100 checks a management list for an authentication request (including information about the MAC address, IP address, and host name of an execution PC) received in order to check whether a target to which the self-response agent unit 90 is to be transferred is legitimate, and notifies the self-response agent unit 90 of the result of the checking (i.e., the result of authentication).

Although the taking-out management server unit 100 has been illustrated as being provided outside the electronic document storage PC units 10 and 50 in FIG. 3, it may be provided within the electronic document storage PC unit 10 or the electronic document storage PC unit 50 as required.

Figure 4:
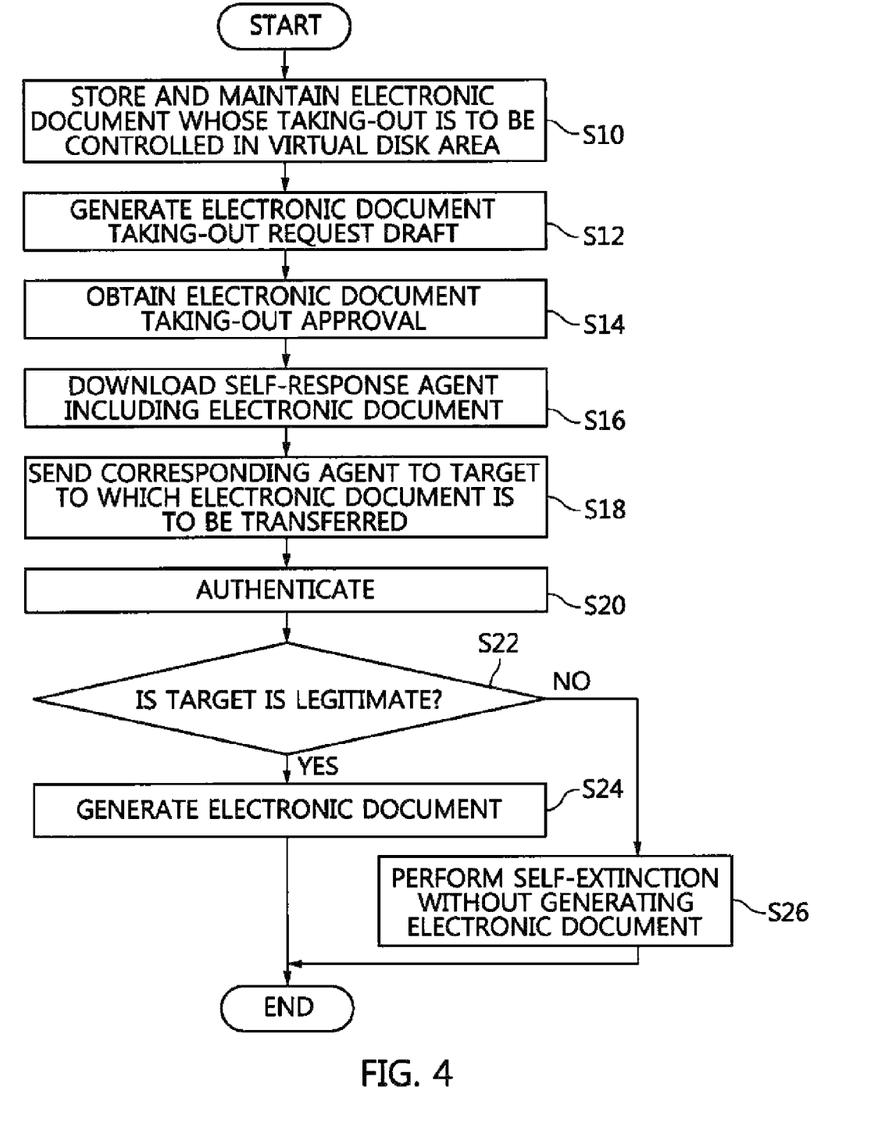
FIG. 4 is a flowchart of a method for preventing the illegitimate outflow of an electronic document according to an embodiment of the present invention.

FIG. 4 is a flowchart of a method of preventing the illegitimate outflow of an electronic document according to an embodiment of the present invention.

First, in order to control the taking-out of an electronic document, the electronic document storage PC units 10 and 50 generate and manage the virtual disks 30 and 70 that forcedly store an electronic document to be controlled. In this case, an application that can access the generated virtual disks 30 and 70 may be limited, and the area of the virtual disk may be encrypted on a per-block basis.

Thereafter, an electronic document whose taking-out is to be controlled is forcedly stored and maintained in the areas of the virtual disks 30 and 70 within the electronic document storage PC unit 10 of the taking-out approval requester and the electronic document storage PC unit 50 of the taking-out approval granter at step S10.

Next, to perform the legitimate taking-out of the electronic document, the taking-out request agent unit 44 of the electronic document storage PC unit 10 of the taking-out approval requester generates an electronic document taking-out request draft at step S12. When the electronic document taking-out request draft is made, the electronic document to be transferred is attached to the self-response agent unit 90 in such a way as to be mounted on the self-response agent unit 90. Meanwhile, when the electronic document taking-out request draft is made, information about a PC that is an taking-out target (e.g., information about the MAC address, IP address, host name, and network of the PC) is also described.

The taking-out management server unit 100 stores and manages all histories (e.g., in a list form) between the taking-out request agent unit 44 and the taking-out approval agent unit 86. Accordingly, the taking-out management server unit 100 sends the electronic document taking-out request draft, made at step S12, to the taking-out approval agent unit 86 of the electronic document storage PC unit 50 of the taking-out approval granter. Thereafter, the taking-out approval agent unit 86 approves the taking-out of the electronic document, and sends the result of the approval to the taking-out request agent unit 44 via the taking-out management server unit 100. Accordingly, the taking-out request agent unit 44 obtains the electronic document taking-out approval at step S14.

At steps S12 and S14 of generating the legitimate taking-out request and approving the taking-out of the electronic document, in order to manage the legitimate taking-out request/approval/list, the hash value of the electronic document, the title of the electronic document, information about the MAC and IP addresses of the receiver terminal of the electronic document, and information about the facial image, iris, or fingerprint of a drafter/granter may be used.

After obtaining the electronic document taking-out approval as described above, the electronic document taking-out request drafter (i.e., the electronic document storage PC unit 10 of the taking-out approval requester) downloads the self-response agent unit 90, including the electronic document, via the taking-out management server unit 100 at step S16, and sends the self-response agent unit 90 to a target to which the electronic document is to be transferred at step S18.

When the self-response agent unit 90 is transferred to the target to which the electronic document is to be transferred, the self-response agent unit 90 is executed on the target to which the electronic document is to be transferred (e.g., a PC). In this case, the self-response agent unit 90 requests the taking-out management server unit 100 to authenticate the target to which the electronic document is to be transferred (or a person to which the electronic document is to be transferred) by sending information about the PC of the target (or the person) to the taking-out management server unit 100 in order to check whether the PC is legitimate (i.e., whether the target to which the electronic document is to be transferred is legitimate). In this case, the information about the PC that is transferred from the self-response agent unit 90 to the taking-out management server unit 100 may include information about the MAC address, IP address, host name, and network of the PC. Accordingly, the taking-out management server unit 100 performs the authentication based on the information about the PC and sends the result of the authentication to the self-response agent unit 90 at step S20. For example, it is assumed that the taking-out management server unit 100 has previously included information about the PCs of targets A and B to which the electronic document is to be transferred. When the electronic document is to be sent to the target A to which the electronic document is to be transferred, the taking-out management server unit 100 may authenticate whether the target A to which the electronic document is to be transferred is legitimate based on the previously stored information. In this case, in order to enhance an authentication function, a legitimate taking-out authentication request period may be previously set. That is, if successive authentication requests are made, an excessive load is exerted onto the system, and proceeding, to a subsequent step is delayed. Accordingly, an authentication request and an authentication process may be performed only during a preset legitimate taking-out authentication request period. At step S20, a security function, such as anti-reversing, obfuscation, anti-debugging, or the like, may be applied in order to prevent a corresponding function from being invalidated or detoured.

That is, if, as a result of the authentication, it is determined that the target to which the electronic document is to be transferred is a legitimate target (i.e., "Yes" at step S22), the taking-out management server unit 100 sends a signal indicating a legitimate target to the self-response agent unit 90. Accordingly, the self-response agent unit 90 generates the electronic document at step S24.

However, if, as a result of the authentication, it is determined that the target to which the electronic document is to be transferred is an illegitimate target (i.e., "No" at step S22), the taking-out management server unit 100 sends a signal indicating an illegitimate target (i.e., a signal indicating that the target to which the electronic document is to be transferred is illegitimate) to the self-response agent unit 90. In this case, if the taking-out management server unit 100 does not have information about the target to which the electronic document is to be transferred, it is impossible to authenticate the target, and thus the authentication fails, with the result that the target is considered to be an illegitimate target. Accordingly, the self-response agent unit 90 performs self-extinction without generating the electronic document at step S26. At the step of obtaining information about the source to which the electronic document is to be illegitimately transferred and performing a self-response (self-extinction) as described above, a security function, such as anti-reversing, obfuscation, anti-debugging, or the like, may be applied in order to prevent a corresponding function from being invalidated or detoured.

As described above, in accordance with an embodiment of the present invention, when an illegitimate outflow attempt is made, a self-response (or self-extinction) can be made and also an illegitimate outflow source can be tracked, so that the illegitimate outflow of an electronic document can be fundamentally blocked.

Accordingly, the economic damage of a company or a nation can be prevented by blocking the illegitimate outflow of an advanced industrial secret attempted by an intelligent hacking scheme and an insider.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for preventing illegitimate outflow of an electronic document, the apparatus comprising:
    one or more processors, memory, and one or more program units stored in the memory and to be executed by the one or more processors, the program units comprising:
    a taking-out control unit configured to generate a virtual disk for storing an electronic document to be controlled and control taking-out of the electronic document, a personal computer (PC) unit of a taking-out approval requester and a PC unit of a taking-out approval granter including the taking-out control unit,
    the taking-out control unit of the PC unit of the taking-out approval requester comprises a virtual disk generation and management unit configured to generate and manage the virtual disk and a taking-out request agent unit configured to request the taking-out of the electronic document,
    the taking-out control unit of the PC unit of the taking-out approval granter comprises a virtual disk generation and management unit configured to generate and manage the virtual disk; and a taking-out approval agent unit configured to approve the taking-out of the electronic document;
    a taking-out management server unit configured to authenticate whether the taking-out of the electronic document is legitimate taking-out; and
    a self-response agent unit configured to perform self-extinction when a result indicating illegitimate outflow is received from the taking-out management server unit,
    wherein in response to detection of a taking-out request draft of the electronic document the taking-out control unit of the PC unit of the taking-out approval requester and sending the taking-out request draft to the PC unit of the taking-out approval granter via the taking-out management server unit, the taking-out control unit of the PC unit of the taking-out approval granter approves the taking-out of the electronic document and sends a result of the approval to the taking-out control unit of the PC unit of the taking-out approval requester via the taking-out management server unit.

2. The apparatus of claim 1, wherein the self-response agent unit provides the taking-out management server unit with information about a target to which the electronic document is to be transferred in order to request authentication from the taking-out management server unit.

3. The apparatus of claim 2, wherein the information about the target comprises one or more of pieces of information about a host name, Media Access Control (MAC) address, Internet Protocol (IP) address, and network of a terminal.

4. The apparatus of claim 1, wherein the taking-out control unit controls the taking-out of the electronic document using a hash value of the electronic document, a title of the electronic document, information about an MAC address, IP address, and host name of a receiver terminal of the electronic document, and information about a drafter or granter.

5. The apparatus of claim 1, wherein the taking-out control unit limits an application that is able to access an area of the generated virtual disk, and encrypts the area of the virtual disk.

6. The apparatus of claim 1, wherein the taking-out management server unit authenticates whether the taking-out of the electronic document is legitimate taking-out within a preset legitimate taking-out authentication request period.

7. A computer-implemented method for preventing illegitimate outflow of an electronic document, the method comprising:
    generating and managing, by taking-out control units of a PC unit of a taking-out approval requester and a PC unit of a taking-out approval granter, respective virtual disks for storing an electronic document to be controlled;
    controlling, by the taking-out control units of the PC unit of the taking-out approval requester and the PC unit of the taking-out approval granter, taking-out of the electronic document via a taking-out management server unit, wherein controlling the taking-out of the electronic document comprises:
    generating, by the taking-out control unit of the PC unit of the taking-out approval requester, a taking-out request draft of the electronic document and sending, by the taking-out control unit of the PC unit of the taking-out approval requester, the taking-out request draft to the PC unit of the taking-out approval granter via the taking-out management server unit; and approving, by the taking-out control unit of the PC unit of the taking-out approval granter, the taking out of the electronic document and sending, by the taking-out control unit of the PC unit of the taking-out approval granter, a result of the approval to the taking-out control unit of the PC unit of the taking-out approval requester via the taking-out management server unit;

authenticating, by the taking-out management server unit, whether the taking-out of the electronic document is legitimate taking-out; and performing, by a self-response agent unit, self-extinction when a result indicating illegitimate outflow is received as a result of authenticating whether the taking-out of the electronic document is legitimate taking-out.

8. The method of claim 7, wherein authenticating whether the taking-out of the electronic document is legitimate taking-out comprises authenticating whether the taking-out of the electronic document is legitimate taking-out based on information about a target to which the electronic document is to be transferred.

9. The method of claim 8, wherein the information about the target comprises one or more of pieces of information about a host name, MAC address, IP address, and network of a terminal.

10. The method of claim 7, wherein controlling the taking-out of the electronic document comprises controlling the taking-out of the electronic document using a hash value of the electronic document, a title of the electronic document, information about an MAC address, IP address, and host name of a receiver terminal of the electronic document, and information about a drafter or granter.

11. The method of claim 7, wherein generating and managing the respective virtual disks comprises limiting an application that is able to access an area of the generated virtual disk, and encrypting the area of the virtual disk.

12. The method of claim 7, wherein authenticating whether the taking-out of the electronic document is legitimate taking-out comprises authenticating whether the taking-out of the electronic document is legitimate taking-out within a preset legitimate taking-out authentication request period.

\* \* \* \* \*